United States Patent
Bechara et al.

(10) Patent No.: US 6,774,181 B1
(45) Date of Patent: Aug. 10, 2004

(54) PROCESS FOR THE PREPARATION OF A SELF-EMULSIFIABLE POLYOLEFIN EMULSION AND HYBRID POLYOLEFIN-POLYURETHANE DISPERSION DERIVED THEREFROM

(75) Inventors: Ibrahim Bechara, Carmel, NY (US); Pavel Ilmenev, Ridgefield, CT (US); Oleg Tselnik, Brooklyn, NY (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 10/612,576

(22) Filed: Jul. 1, 2003

(51) Int. Cl.$^7$ .......................... C08J 3/05; C09D 123/26
(52) U.S. Cl. .......................... 525/66; 525/69; 525/123; 525/127; 525/130; 525/185; 525/191; 525/197; 525/198; 525/240
(58) Field of Search .......................... 525/66, 69, 123, 525/127, 130, 185, 191, 197, 198, 240

(56) References Cited

U.S. PATENT DOCUMENTS

| | | |
|---|---|---|
| 3,814,715 A | 6/1974 | Nalley et al. |
| 4,240,944 A | 12/1980 | Temple |
| 4,283,322 A | 8/1981 | Temple |
| 4,507,430 A | 3/1985 | Shimada et al. |
| 4,728,573 A | 3/1988 | Temple |
| 5,004,784 A | 4/1991 | Huynh-Ba |
| 5,389,440 A * | 2/1995 | Arpin et al. ................. 428/391 |
| 5,430,093 A | 7/1995 | Miyamoto et al. |
| 5,559,176 A | 9/1996 | Namba et al. |
| 6,008,286 A | 12/1999 | Groves |
| 6,166,118 A * | 12/2000 | Hyche et al. ................. 524/315 |
| 6,339,125 B1 | 1/2002 | Bechara et al. |
| 6,465,559 B1 | 10/2002 | Bechara et al. |

FOREIGN PATENT DOCUMENTS

| | | | |
|---|---|---|---|
| FR | 2 588 263 | 10/1985 | |
| WO | WO 9955744 A1 * | 11/1999 | ............. C08F/8/46 |
| WO | WO 02/36654 A2 | 5/2002 | |

* cited by examiner

Primary Examiner—Kelechi C. Egwim
(74) Attorney, Agent, or Firm—Michael P. Dilworth

(57) ABSTRACT

A process for making an aqueous emulsion of self-emulsifiable polyolefin employs a high molecular weight functionalized polyolefin and a hydrophilic polymer. The aqueous emulsion can be used to prepare a hybrid polyolefin-polyurethane dispersion useful, inter alia, as an adhesion-promoting coating for polymers such as the polyolefins.

68 Claims, No Drawings

PROCESS FOR THE PREPARATION OF A SELF-EMULSIFIABLE POLYOLEFIN EMULSION AND HYBRID POLYOLEFIN-POLYURETHANE DISPERSION DERIVED THEREFROM

BACKGROUND OF THE INVENTION

1. Field of the Invention

This invention relates to a process of making a self-emulsifiable polyolefin aqueous emulsion of relatively high molecular weight and to a hybrid polyolefin-polyurethane dispersion obtained therefrom.

2. Description of Related Art

The use of polyolefins such as polyethylene, polypropylene, copolymers of ethylene and alpha-olefins, and ethylene-propylene-diene terpolymer (EPDM) continues to grow at a rate faster than that of many other resins due to their low cost and excellent balance between design flexibility, mechanical properties and recyclability.

In order to improve the mechanical properties of the myriad of consumer goods made from the foregoing types of polyolefins, these resins are commonly reinforced with fillers, e.g., glass fibers. Glass fiber-reinforced polyolefins have better dimensional stability, tensile strength, flexural modulus, flexural strength, impact resistance and creep resistance than non-reinforced polyolefins. The glass fibers are generally treated with a sizing composition that performs several functions. It protects the fibers in a strand during processing and it has the capability to couple or adhere the glass fibers to the polyolefin. Aqueous polyolefin emulsions have been found to be useful for glass fiber treatment in thermoplastic polyolefin (TPO) reinforcement. However, they are not good film-formers and require the use of another film-forming component to achieve additional useful properties such as good strand integrity.

Due to the generally poor photo stability of polyolefins, parts made from, e.g., TPO are not used for the exterior parts of automobiles without first being given a protective coating. Another reason for using coatings is the desire that parts made from these resins match the color and gloss of the main automobile body. However, most coating systems cannot be used on polypropylene and other TPO substrates due to poor adhesion. This lack of adhesion can be attributed to the generally poor wettability, good solvent resistance and very low surface energy of the TPO. TPO belongs to the group of polymers with the lowest surface energy, next to that of the polysiloxanes and fluoropolymers.

The most common approach to overcoming the technical difficulties encountered in the coating of TPO and similar polyolefins in general is to use an adhesion-promoting primer coating based on chlorinated polyolefin resin. Primers often contain significant amounts of volatile organic compounds (VOC). This is a significant disadvantage for a finisher who is required to comply with strict federal and state environmental emission standards. In addition, halogen-containing organics such as chlorinated polyolefin present environmental concerns of their own.

Therefore, it would be advantageous to replace a chlorinated polyolefin based primer with one having good adhesion to TPO but lacking a significant VOC component and in addition, lacking a halogen-containing organic component.

As stated above, high molecular weight polyolefins have been shown to have improved physical properties in sizing and in promoting adhesion. But high molecular weight polyolefins such as isotactic polypropylene are known for having high melting temperatures and high melt viscosities. This presents a dual problem. First of all, the usefulness of a polyolefin emulsion is generally determined by the compatibility of the emulsified material with the polyolefin. The increased melt viscosity of a high molecular weight polyolefin decreases its compatibility in an emulsion. This is generally dealt with by combining the high molecular weight polyolefin with a low molecular weight polyolefin in a sealed pressure vessel to a temperature above the melting point of the high molecular weight polyolefin. This combination of a low molecular weight polyolefin to the high molecular weight polyolefin reduces the melt viscosity of the overall mixture. The resultant polyolefin must then be combined with water at the elevated temperature and pressure to form a stable aqueous emulsion.

Secondly, methods for emulsification of functionalized polyolefins, known in the art, require mixing of the molten polyolefin with water in the presence of colloidal stabilizers. This poses a problem of the cost of the equipment and the extra time required in using a pressure vessel.

Therefore, it would be advantageous to develop a method for emulsification of functionalized polyolefins at normal atmospheric pressure. These polyolefins could then be emulsified at any time and at any pressure.

Various methods have been described in the prior art for the formation of high molecular weight polyolefin emulsions.

U.S. Pat. No. 4,283,322 describes the use of low molecular weight amorphous carboxylated polypropylene along with isotactic carboxylated polypropylene for making stable emulsions. However, this patent does not address the difficulty of making emulsions of high molecular weight isotactic polypropylene.

U.S. Pat. No. 5,389,440 describes a method for the emulsification of polyolefins having molecular weight greater than 10,000 where a fatty acid material is used to successfully emulsify a high molecular weight polyolefin. This process produces emulsions with relatively large particles, which tend to separate upon standing (creaming).

U.S. Pat. No. 6,166,118 describes a process for emulsification of high molecular weight functionalized polyolefins, which employs "an indirect, or dilution method of pressure emulsification". Although it still requires the preparation of a "pre-emulsion", or "emulsion concentrate", with its subsequent dilution to practically usable concentration.

French Patent No. 2,588,263 described a technique, in which high molecular weight crystalline polyolefin is dissolved in hydrocarbon solvent first, to make it easier to disperse. This technique requires subsequent removal of the solvent and brings safety concerns.

SUMMARY OF THE INVENTION

It is an object of the present invention to provide a process for making a polyolefin of relatively high weight average molecular weight, i.e., of at least about 30,000 that is self-emulsifiable under normal atmospheric conditions and to further make an aqueous polyolefin emulsion thereof.

It is a further object of the present invention to provide a hybrid polyolefin-polyurethane dispersion based on the foregoing emulsion of polyolefin, advantageously, one which lacks any appreciable quantity of volatile organic compound and/or halogen-containing organic compound.

In keeping with these and other objects of the invention there is provided a process for preparing an aqueous emulsion of self-emulsifiable polyolefin comprising the steps of:

(a) providing a mixture of:
1. at least one first polyolefin possessing a first reactive functionality and having a weight average molecular weight of at least about 30,000; and
2. at least one hydrophilic polymer possessing a second reactive functionality being reactive with the first reactive functionality of polyolefin (1) and having a weight average molecular weight less than that of polyolefin (1); and (b) heating the mixture of step (a) to a temperature at or above the melting point of polyolefin (1), first reactive functionality of polyolefin (1) reacting with second reactive functionality of hydrophilic polymer (2) at said temperature to provide a self-emulsifiable polyolefin; and (c) adding an emulsion-forming amount of water to the self-emulsifiable polyolefin of step (b) to provide an aqueous emulsion of the self-emulsifiable polyolefin.

In addition, there is provided a process for making a hybrid aqueous dispersion of polyolefin and polyurethane which comprises:

a) providing at least one water-dispersible polyurethane prepolymer;

b) dispersing the water-dispersible polyurethane prepolymer of step (a) in at least one aqueous emulsion of polyolefin prepared by the foregoing emulsification process; and, c) reacting dispersed polyurethane prepolymer with at least one difunctional chain extender to provide a hybrid aqueous dispersion of polyolefin and polyurethane.

The hybrid aqueous dispersion of polyolefin and polyurethane possesses good film-forming properties at room temperature and is useful in coatings processes where it improves the adhesion of coatings to various kinds of substrates. Another application of the foregoing hybrid aqueous polyolefin-polyurethane dispersion is for the treatment of glass fibers used as fillers in the reinforcement of polyolefin resins such as PE, PP, ethylene/alpha-olefin copolymer, TPO, and the like. In a preferred embodiment, the hybrid aqueous polyolefin-polyurethane dispersion contains no appreciable quantity of volatile organic compound(s) and/or chlorine-containing organic compound(s).

DESCRIPTION OF THE PREFERRED EMBODIMENTS

In the process of this invention, the polyolefin possessing a first reactive functionality can be derived from any of a variety of polyolefins that are subsequently provided with carboxylic acid functionality employing known and conventional procedures. The expression "carboxylic acid functionality" shall be understood to include the carboxylic acid group, and the anhydride group which in aqueous media undergoes ring-opening to provide carboxylic acid groups. The polyolefins are generally obtained from olefinic monomers containing from 2 to about 8 carbon atoms. Examples of useful polyolefins include, polyethylene, polypropylene, copolymers of ethylene and propylene and/or other alpha-olefins and terpolymers of ethylene, propylene and at least one other diene monomer such as butadiene. Preferably, the polyolefin is an isotactic polypropylene.

The polyolefin possessing a first reactive functionality will ordinarily have a weight average molecular weight of greater than about 30,000 and more preferably greater than about 50,000. The carboxylic functionality of the polyolefin possessing a first reactive functionality can be introduced by any number of known and conventional techniques including, but not limited to, thermal oxidation and the grafting of acids or anhydrides to the polyolefin backbone. Grafting generally involves the reaction of a polyolefin with an ethylenically unsaturated carboxylic acid, polycarboxylic acid or carboxylic acid anhydride. Specific carboxylic acids and carboxylic acid anhydrides that can be grafted onto the first polyolefin include maleic acid, fumaric acid, itaconic acid, citraconic acid, acrylic acid, methacrylic acid, crotonic acid, isocrotonic acid, mesaconic acid, maleic anhydride and itaconic anhydride. The carboxylic functionality of the polyolefin can also be introduced via copolymerization of carboxylic functionality-containing olefinic monomer such as acrylic or methacrylic acids, and the like.

Preferably, functionalization of the polyolefin possessing a first reactive functionality is achieved by grafting maleic anhydride to the polyolefin employing any of the known maleation procedures. The amount of grafted maleic anhydride in the maleated polyolefin is advantageously at least about 0.5 wt percent, and preferably, is from about 1 to about 1.5 wt percent, of the polyolefin possessing a first reactive functionality. Examples of suitable polyolefins possessing a first reactive functionality include Polybond 3000 and Polybond 3200 (maleated polypropylene, Crompton, Middlebury, Conn.).

High molecular weight polyolefins such as the polyolefin possessing first reactive functionality herein can be difficult to emulsify due to their relatively high melt viscosities. To deal with this technical problem, the emulsification process of this invention combines the polyolefin of first reactive functionality with a hydrolyphilic polymer possessing a second reactive functionality which (1) possesses a weight average molecular weight significantly below that of the polyolefin possessing first reactive functionality, (2) is chemically stable at or above the melting temperature of the polyolefin of first reactive functionality and, optionally, (3) contains hydroxyl, amino or epoxy functionality. Due to the hydrophilic polymer possessing a second reactive functionality having a molecular weight that is considerably lower than that of the polyolefin possessing first reactive functionality, when the two are combined, the resulting mixture will possess a lower overall viscosity, as such making it more readily emulsifiable. The mixture of polyolefin of first reactive functionality and the hydrophilic polymer possessing a second reactive functionality optionally has added thereto a low molecular weight functionalized polyolefin having a weight average molecular weight appreciably less than that of the first polyolefin, e.g., less than about 10,000 to provide a decrease in the melt viscosity of the mixture.

The optional low molecular weight functionalized polyolefin which can be added to the stated mixture can be selected from among such polyolefins as A-C596 and A-C597 (polypropylene-maleic anhydride co-polymers, Honeywell Specialty Chemicals Morristown, N.J.). Preferably, the functionality of the low molecular weight functionalized polyolefin can represent from about 0 wt percent to about 50 wt percent of the compound.

Examples of useful hydrophilic polymers possessing a second reactive functionality include polymers of ethylene oxide or copolymers of ethylene oxide and propylene oxide, bearing hydroxyl, amino, epoxy or any other functionality, capable of reacting with functional groups of the polyolefin possessing first reactive functionality. Preferable examples of such hydrophilic polymers are mono-alkyl ethers of polyethyleneoxide and alkyl ether amines and more preferable examples of mono-functional hydrophilic polymers are polyethylene glycol monomethyl ether such as Polyglykol M (Clariant GMBH, Germany), having a weight average molecular weight of 2,000, available from Clariant GMBH, Germany, and alkyl ether amine or methoxypoly-(oxyethylene/oxypropylene)-2-propylamine Jeffamine® M-2070, having molecular weight of 2,000, available from Huntsman Petrochemical Corporation, Houston, Tex. Generally, the hydrophilic polymer will have a weight average molecular weight of from about 300 to about 4,000 and preferably from about 500 to about 3000.

The amounts of polyolefin possessing a first reactive functionality, hydrophilic polymer possessing a second reactive functionality and optional low molecular weight functionalized polyolefin, utilized in the preparation of a particular self-emulsifiable polyolefin will depend upon a number of well-understood factors including the specific nature of the components and the particular end-use or application to which the self-emulsifiable polyolefin and emulsion thereof will be put. These amounts can vary within fairly wide limits. In general, a self-emulsifiable polyolefin in accordance with the invention can contain from about 30 to about 90, and preferably from about 50 to about 70 wt percent polyolefin possessing a first reactive functionality; from about 5 to about 50, and preferably from about 10 to about 30 wt percent of a hydrophilic polymer possessing a second reactive functionality and from about 0 to about 50, and preferably from about 10 to about 30 wt percent of an optional low molecular weight functionalized polyolefin.

Generally, the polyolefin possessing a first reactive functionality and the hydrophilic polymer possessing a second reactive functionality are present in an amount sufficient to provide a ratio of first reactive functionality to second reactive functionality of from about 3:2 to about 1:3.

The process of the invention requires heating the above-described mixture of polyolefin possessing first reactive functionality, hydrophilic polymer possessing a second reactive functionality and optionally a low molecular weight functionalized polyolefin to an elevated temperature which is at or above the melting point of the polyolefin possessing a first reactive functionality. In order to achieve such a temperature, in the current invention, the components of the emulsion-forming composition do not have to be heated in a sealed vessel thus subjecting the composition to elevated pressure. The heating can occur under normal atmospheric pressure. Suitable elevated temperatures can range from about 150 to about 250° C., and preferably from about 175 to about 190° C., depending on the nature and amounts of the various components of the self-emulsifiable polyolefin to be formed. While the contents of the vessel are at the elevated temperature, i.e., while the polyolefin possessing a first reactive functionality is at or above its melt temperature, the polyolefin possessing a first reactive functionality and the hydrophilic polymer possessing a second reactive functionality and optionally a low molecular weight functionalized polyolefin react at least partially through their respective functionalities. The period of time necessary for this to occur can vary greatly depending on the nature of the respective components and the specific elevated temperature at which they are maintained. Generally, the period of time can be from about ½ to about 5 hours and preferably from about ½ to about 2 hours. During this time, a phase separation occurs, which renders the functionalized polyolefin self-emulsifiable. The self-emulsifiable polyolefin which is produced can then be combined with water and optionally a base for neutralizing the carboxylic or anhydride functionality of the self emulsifiable polyolefin to form a stable aqueous emulsion.

The amount of water used will be dependent upon the nature of the components that are used and also upon the eventual use to which the aqueous emulsion will be put. Generally the amount of water can vary from about 30 to about 85 wt percent of the emulsion. The bases that can be optionally introduced can be in an amount of from about 0 to about 5 wt percent of the emulsion.

Suitable bases for achieving neutralization include alkali and alkaline earth metal hydroxides, ammonium hydroxide and amine compounds such as: aqueous ammonia, 2-dimethylamino-2-methyl-1-propanol, N,N-diethylaminoethanol or N,N-dimethylaminopropanol, triethyl amine, triisopropyl amine, tributyl amine, N,N-dimethyl-cyclohexyl amine, N,N-dimethyl stearyl amine, N,N-dimethylaniline, N-methylmorpholine, N-ethylmorpholine, N-methylpiperazine, N-methylpyrrolidine, N-piperidine, N,N-dimethyl-ethanol amine, N,N-diethyl-ethanol amine, triethanol amine, N-methyldiethanol amine, dimethylaminopropanol, 2-methoxyethyldimethyl amine, N-hydroxyethylpiperazine; 2-(2-dimethylaminoethoxy)-ethanol and 5-diethylamino-2-pentanone.

The average particle size and viscosity of the emulsified polyolefin can vary widely depending on the choice and amounts of its components. In general, the average particle size of the emulsified polyolefin can range from about 0.1 to about 10 microns and the viscosity can range from about 10 to about 10,000 centipoise (cps). Preferably, the average particle size will range from about 0.2 to about 5.0 microns and the viscosity will range from about 20 to about 1,000 cps.

The present invention further involves utilizing the aqueous emulsion of self-emulsified polyolefin to prepare a hybrid aqueous dispersion of polyolefin and polyurethane. The process of preparing the hybrid dispersion comprises providing at least one water-dispersible polyurethane prepolymer, dispersing the prepolymer in at least one aqueous emulsion of self-emulsified polyolefin as described above and adding a difunctional chain extender to the dispersion which then reacts with polyurethane prepolymer to form polyurethane.

The water-dispersible polyurethane prepolymer can be prepared by reacting, (a) a mixture of active hydrogen functionality-containing compound selected from at least one member of the group consisting of (i) hydrocarbon polymer containing at least one terminal hydroxyl group, (ii) hydrophilic group-containing diol and, optionally, (iii) at least one member of the group consisting of polymeric polyol, low molecular weight diol, monofunctional reactant and trifunctional or higher functionality branching reactant, with (b) at least one diisocyanate.

Hydrocarbon polymer (i) can be obtained from the polymerization of at least one olefinic monomer, diene monomer or vinyl monomer. Preferably hydrocarbon polymer (i) is a hydroxyl-terminated polybutadiene or a hydrogenated derivative thereof. Examples of useful hydrocarbon polymers include, for example, Polybond R45 HTLO and Krasol HLB 2000 (Sartomer, a Division of Atofina, Exton, Pa.).

Hydrophilic group-containing diol (ii) is at least one member selected from the group consisting of ionic group-containing compound, ion-forming group containing compound, which is any compound containing a functional group, e.g., —COOH, which can be ionized to facilitate reactivity, e.g., dimethylol propane and terminal nonionic hydrophilic group-containing compounds such as methoxy poly(oxyethylene). It is to be understood that cationic polyurethane prepolymers can be dispersed only into a cationic polyolefin emulsion to yield a cationic hybrid.

The terminal nonionic hydrophilic group-containing compound can be a polyethylene oxide and the ionic group-containing compound can be at least one member selected from the group consisting of carboxylate compound, sulfonate compound and quaternary nitrogen compound. Advantageously, the ionic group-containing compound is a dihydroxy alkanoic acid such as dimethylol propionic acid or dimethylol butanoic acid. The ionic groups are formed by neutralizing the corresponding ionic groups, e.g. carboxyl, prior to, during, or after forming the water-dispersible polyurethane prepolymer.

Polymeric polyol (iii) is well known in the field of polyurethane chemistry. Examples of suitable polymeric polyols include the polyester diols, polyether diols, polyetherester diols, polyesterether diols, polythioester dithiols, polycarbonate diols, polyacetal diols, polycaprolactone polyols and mixtures thereof.

Advantageously, a low molecular weight dihydroxy compound such as a short chain aliphatic diol or polyol can also be used. A preferred short chain aliphatic diol or polyol is trimethylolpropane which can be used when slight branching of the water-dispersible polyurethane prepolymer is desired.

Diisocyanate (b) is preferably one conforming to the general formula $R(NCO)_2$ wherein R is a divalent aliphatic group containing from 4 to about 18 carbon atoms or a divalent cycloaliphatic group containing from 5 to about 15 carbon atoms and mixtures thereof. Suitable diisocyanates include hexamethylene diisocyanate, cyclohexane-1,3-diisocyanate, cyclohexane-1,4-diisocyanate, 1-isocyanato-3-isocyanatomethyl-3, 5,5-trimethyl-cyclohexane, bis-(4-isocyanatocyclohexyl)methane, 1,3-bis-(isocyanatomethyl)cyclohexane, 1,4-bis-(isocyanatomethyl)cyclohexane and bis-(4-isocyanato-3-methyl-cyclohexyl)methane.

The ratio of isocyanate groups in the diisocyanate to active hydrogen functionality in the active hydrogen functionality-containing compound can range from about 1.1 to about 3, and preferably from about 1.2 to about 2, on an equivalent basis.

This invention also contemplates possible chemical bonding through the reaction of the polyurethane prepolymer component of the hybrid dispersion and the neutralized carboxylic acid functionality of the first polyolefin component.

Chemical bonding can be facilitated further by providing polypropylene emulsions with additional active hydrogen functionality. This can be done by first reacting the maleated polypropylene with, for example, amines, alkanol amines, alkyl ether amines, diamines, epoxides, and the like, followed by emulsification of the resulting product as described previously. Preferred compounds include, but are not limited to, polyethylene glycol monomethyl ether, such as Polyglykol M Clariant GMBH, Germany, alkyl ether amine, methoxypoly-oxyethylene/oxypropylene)-2-propylamine, glycidyl ester of versatic acid, carboxylic acid, carboxylic acid anhydride, hydroxylamine, 2-aminoethanol, diethanolamine, 2-(diethanolamino)ethylamine and 3-(diethanolamine)propylamine. Use of dialkylaminoalkylamines such as 2-(dimethylamino)ethylamine, 3-(diethylamino)propylamine, for reaction with the carboxylate groups of the first polyolefin will provide quarternizable centers which are useful for achieving cationic colloidal stabilization of the hybrid aqueous dispersion.

The dispersion of the polyurethane prepolymer into the aqueous polypropylene emulsion is formed by adding the polyurethane prepolymer with agitation to the aqueous polypropylene emulsion or by adding the polyurethane prepolymer with continuous agitation, either in a batch-types process or a continuous process, e.g., by utilizing a pin-mixer.

After the water-dispersible polyurethane prepolymer is dispersed into the aqueous polypropylene emulsion, it can be chain extended with any of a variety of difunctional compounds or mixtures thereof. The difunctional chain extender advantageously used herein is a diamine such as hydrazine, adipic dihydrazide, ethylene diamine, hexane diamine, diisophorone diamine, polyoxypropylene diamine, 2-methyl pentane diamine, piperazine or mixtures thereof. In some instances where higher cross-link density is desirable, a small amount of a trifunctional amine such as diethylene triamine can optionally be added during the chain-extension step. Similarly, hydroxyl functionality can be introduced into the hybrid during the chain extension reaction by employing alcohol amines such as hydroxyethyl ethylenediamine, diethanolamine, and the like.

While the water-dispersible polyurethane prepolymer can be prepared employing an inert organic solvent, e.g., an ether, ester, ketone, amide, etc., it is preferred to exclude the use of such a material as it is often advantageous to provide the final hybrid polyolefin-polyurethane dispersion substantially free of volatile organic compounds.

The following examples are illustrative of the process of preparing a self-emulsifiable polyolefin emulsion of this invention.

EXAMPLE 1

101.4 grams of polyethylene glycol monomethyl ether, having a molecular weight of 2,000, 149.0 grams of high-molecular weight maleated polypropylene Polybond® 3200 and 49.7 grams of low-molecular weight maleated polypropylene A-C® 597 were heated in a glass reactor, equipped with a stirrer under the flow of nitrogen until completely melted. The mixture was then held at 175° C. for three hours under moderate stirring. After the material was cooled to room temperature, it was transferred in solid form into a different vessel, containing 683.0 grams of water and 8.3 grams of 2-dimetylamino-2-methyl-1-propamol (DMAMP-80, 80% in water). After moderate agitation was applied, the solid material dispersed in the water, forming a stable aqueous emulsion, which had a solids content of 30.7% and a pH of 9.0.

EXAMPLE 2

120.4 grams of methoxypoly(oxyethylene/oxypropylene)-2-propylamine Jeffamine M-2070, having molecular weight of 2,000, 97.2 grams of high molecular weight maleated polypropylene Polybond® 3200 and 32.4 grams of low-molecular weight maleated polyproylene A-C® 597 were heated in a glass reactor, equipped with a stirrer under the flow of nitrogen until completely melted, and then held at 175° C. for three hours under moderate stirring. After the material was cooled to room temperature, it was transferred in solid form into a different vessel, containing 577.8 grams of water. The solid material was then dispersed in the water under moderate agitation, forming a stable aqueous emulsion, which had a solids content of 33.2% and a pH of 9.0.

EXAMPLE 3

144.35 grams of high-molecular weight maleated polypropylene Polybond® 3200, 91.2 grams of methoxypoly(oxyethylene/oxypropylene)-2-propylamine Jeffamine M-2070, having molecular weight of 2,000, and 14.4 grams of low-molecular weight maleated polypropylene A-C® 597 were heated in a glass reactor, equipped with a stirrer under the flow of nitrogen until completely melted, and then held at 175° C. for three hours under moderate stirring. After the material was cooled to room temperature, it was transferred in solid form into a different vessel, containing 575.3 grams of water. The solid material was then dispersed in the water under moderate agitation, forming a stable aqueous emulsion, which had a solids content of 30.7%.

EXAMPLE 4

This example illustrates the preparation of a hybrid polyolefin-polyurethane dispersion according to the present invention.

76.6 grams of hydroxyl-terminated polybutadiene Krasol LBH 200, having average molecular weight of 2,000 (available from Sartomer, a Division of Atofina, Exton, Pa.); 25.6 grams of polypropylene glycol (PPG-2000), having molecular weight of 2,000; 11.9 grams of dimethylolpropionic acid; 18.0 grams of N-methylpirrolidinone (M-Pyrol) and 42.0 grams of isophorone diisocyanate (IPDI) were charged in glass reactor equipped with stirrer and heated to 80° C. After maintaining temperature at 80° C. for three hours, free NCO content dropped to 3.67% (as measured by standard reverse titration method with dibutylamine; the calculated value was 3.62%). The resulting polyurethane prepolymer was then dispersed in the mixture of 543.8 grams of modified polypropylene emulsion, prepared according to the Example 1 of the present invention, 340.0 grams of water and 9.3 grams of triethylamine. The resulting dispersion was treated with 5.00 grams of 35% aqueous hydrazine monohydrate solution for prepolymer chain extension. The dispersion was kept under stirring for additional hour at approximately 30–40° C. in order to complete chain extension process in reaction of the isocyanate functionality of the prepolymer with water. The hybrid polyurethane-polyolefin dispersion had solid content of 30.4%, pH=8.7, viscosity=30 cps (Brookfield LV spindle #2 @ 60 rpm) and average particle size of 140 nm.

What is claimed is:

1. A process for making an aqueous emulsion of self-emulsifiable polyolefin which comprises the steps of:
   (a) providing a mixture of:
      1. at least one polyolefin possessing a first reactive functionality and having a weight average molecular weight of at least about 30,000; and
      2. at least one hydrophilic polymer possessing a second reactive functionality being reactive with the first reactive functionality of polyolefin (1) and having a weight average molecular weight less than that of polyolefin (1); and
   (b) heating the mixture of step (a) to a temperature at or above the melting point of polyolefin (1), first reactive functionality of polyolefin (1) reacting with second reactive functionality of hydrophilic polymer (2) at said temperature to provide a self-emulsifiable polyolefin; and
   (c) adding an emulsion-forming amount of water to the self-emulsifiable polyolefin of step (b) to provide an aqueous emulsion of the self-emulsifiable polyolefin.

2. The process of claim 1 wherein the polyolefin (1) and the hydrophilic polymer (2) are present in an amount sufficient to provide a ratio of first reactive functionality to second reactive functionality of from about 3:2 to about 1:3.

3. The process of claim 1 wherein the functionality of polyolefin (1) and the functionality of hydrophilic polymer (2), each is a different coreactive functionality selected from the group consisting of carboxylic acid and carboxylic acid anhydride.

4. The process of claim 3 wherein functionality of polyolefin (1) is present as grafted maleic anhydride in an amount of at least about 0.5 wt. percent of polyolefin (1).

5. The process of claim 3 wherein the functionality of polyolefin (1) is present as grafted maleic anhydride in an amount of from about 1 to about 1.5 wt percent of polyolefin (1).

6. The process of claim 3 wherein the functionality of hydrophilic polymer (2) is present as grafted maleic anhydride in an amount of at least about 3 wt percent of hydrophilic polymer (2).

7. The process of claim 3 wherein the carboxylic acid functionality hydrophilic polymer (2) is present as grafted maleic anhydride in an amount of from about 5 to about 7 wt percent of hydrophilic polymer (2).

8. The process of claim 1 wherein polyolefin (1) has a weight average molecular weight of at least about 50,000.

9. The process of claim 1 wherein polyolefin (1) is at least one member selected from the group consisting of functionalized polyethylene, functionalized polypropylene, functionalized copolymer of ethylene and at least one other alpha-olefin and functionalized terpolymer of ethylene, propylene and at least one diene monomer.

10. The process of claim 9, wherein the functionalized polypropylene is a functionalized isotactic polypropylene.

11. The process of claim 9 wherein the functionalized terpolymer of ethylene, propylene and at least one diene monomer is a functionalized terpolymer of ethylene, propylene and butadiene.

12. The process of claim 1 wherein the hydrophilic polymer (2) has a weight average molecular weight of less than about 10,000.

13. The process of claim 12 wherein the hydrophilic polymer (2) is at least one member of the group consisting of polymers of ethylene oxide, polymers of propylene oxide, copolymers of ethylene oxide and propylene oxide, monoalkyl ethers of polyethylene oxide and alkyl ether amines.

14. The process of claim 13 wherein hydrophilic polymer (2) is a polyethylene glycol or derivatives thereof having a weight average molecular weight of from about 300 to about 4000.

15. The process of claim 13 wherein hydrophilic polymer (2) is a poly(oxyethylene-co-oxypropylene) ether glycol or derivatives thereof having a weight average molecular weight of from about 500 to about 2000.

16. The process of claim 1 wherein the polyolefin (1) is at least one member selected from the group consisting of polyethylene, polypropylene, copolymer of ethylene and propylene and copolymer of ethylene, propylene and at least one other olefinic monomer, and hydrophilic polymer (2) is at least one member selected from the group consisting of polymers of ethylene oxide, polymers of propylene oxide and copolymers of ethylene oxide and propylene oxide.

17. The process of claim 16 wherein the functionality of polyolefin (1) and the functionality of hydrophilic polymer (2) each is a different coreactive functionality selected from the group consisting of carboxylic acid and carboxylic acid anhydride.

18. The process of claim 16 wherein polyolefin (1) has a weight average molecular weight of at least about 50,000 and hydrophilic polymer (2) has a weight average molecular weight of less than about 10,000.

19. The process of claim 1 wherein the mixture of step (a) contains from about 30 to about 90 wt. percent of polyolefin (1), from about 5 to about 50 wt. percent hydrophilic polymer (2) and the emulsion-forming amount of water added in step (c) is from about 30 to about 85 wt. percent.

20. The process of claim 1 wherein the mixture of step (a) contains from about 50 to about 70 wt. percent of polyolefin (1), from about 10 to about 30 wt. percent hydrophilic polymer (2) and the emulsion-forming amount of water added in step (c) is from about 50 to about 70 wt. percent.

21. The process of claim 20 wherein the mixture of step (a) optionally contains a low molecular weight functionalized polyolefin.

22. The process of claim 21 wherein the optional low molecular weight functionalized polyolefin is from about 0 to about 50 wt. percent of the mixture of step (a).

23. The process of claim 16 wherein the mixture of step (a) contains from about 30 to about 90 wt. percent of polyolefin (1), from about 5 to about 50 wt. percent hydrophilic polymer (2) and the emulsion-forming amount of water added in step (c) is from about 30 to about 85 wt. percent.

24. The process of claim 16 wherein the mixture of step (a) contains from about 50 to about 70 wt. percent of polyolefin (1), from about 10 to about 30 wt. percent hydrophilic polymer (2) and the emulsion-forming amount of water added in step (c) is from about 50 to about 70 wt. percent.

25. The process of claim 24 wherein the mixture of step (a) optionally contains a low molecular weight functionalized polyolefin.

26. The process of claim 25 wherein the optional low molecular weight functionalized polyolefin is from about 0 to about 50 wt. percent of the mixture of step (a).

27. The aqueous emulsion resulting from the process of claim 1.

28. The aqueous emulsion of claim 27 wherein the average particle size of the emulsified self-emulsifiable polyolefin ranges from about 0.1 to about 10 microns and the viscosity of the emulsion ranges from about 10 to about 10,000 cps.

29. The aqueous emulsion of claim 27 wherein the average particle size of the emulsified self-emulsifiable polyolefin ranges from about 0.2 to about 5 microns and the viscosity of the emulsion ranges from about 20 to about 1000 cps.

30. An aqueous emulsion of self-emulsifiable polyolefin which comprises the reaction product of at least one polyolefin (1) possessing a first reactive functionality and having a weight average molecular weight of at least about 30,000 and at least one hydrophilic polymer (2) possessing a second reactive functionality which is reactive with the first reactive functionality of polyolefin (1) and having a weight average molecular weight of less than that of polyolefin (1), and water in an aqueous emulsion-forming amount.

31. The aqueous emulsion of claim 30 wherein polyolefin (1) and hydrophilic polymer (2) are present in an amount sufficient to provide a ratio of first reactive functionality to second reactive functionality of from about 3:2 to about 1:3.

32. The aqueous emulsion of claim 30 wherein the functionality of polyolefin (1) and the functionality of hydrophilic polymer (2) each is a different coreactive functionality selected from the group consisting of carboxylic acid, and carboxylic acid anhydride.

33. The aqueous emulsion of claim 30 wherein the average particle size of the emulsified self-emulsifiable polyolefin ranges from about 0.1 to about 10 microns and the viscosity of the emulsion ranges from about 10 to about 10,000 cps.

34. The aqueous emulsion of claim 30 wherein the average particle size of the emulsified self-emulsifiable polyolefin ranges from about 0.2 to about 5 microns and the viscosity of the emulsion ranges from about 20 to about 1000 cps.

35. A process for making a hybrid aqueous dispersion of self-emulsifiable polyolefin and polyurethane which comprises:

a) providing at least one water-dispersible polyurethane prepolymer;

b) dispersing the water-dispersible polyurethane prepolymer of step (a) in at least one aqueous emulsion of self-emulsifiable polyolefin prepared by the process of claim 3 to provide a hybrid aqueous dispersion of the water-dispersible polyurethane prepolymer and self-emulsifiable polyolefin; and, c) adding at least one difunctional chain extender to the hybrid aqueous dispersion of step (b).

36. The process of claim 35 wherein the water-dispersible polyurethane prepolymer is prepared by reacting, (a) a mixture of active hydrogen functionality-containing compound selected from at least one member of the group consisting of (i) hydrocarbon polymer containing at least one terminal hydroxyl group, (ii) hydrophilic group-containing diol and, optionally, (iii) at least one member of the group consisting of polymeric polyol, low molecular weight diol, monofunctional reactant and trifunctional or higher functionality branching reactant, with (b) at least one diisocyanate.

37. A process for making a hybrid aqueous dispersion of self-emulsifiable polyolefin and polyurethane which comprises:

a) providing at least one water-dispersible polyurethane prepolymer;

b) dispersing the water-dispersible polyurethane prepolymer of step (a) in at least one aqueous emulsion of self-emulsifiable polyolefin prepared by claim 32 to provide a hybrid aqueous dispersion of the water-dispersible polyurethane prepolymer and self-emulsifiable polyolefin; and, c) adding at least one difunctional chain extender to the hybrid aqueous dispersion of step (b).

38. The process of claim 37 wherein the water-dispersible polyurethane prepolymer is prepared by reacting, (a) a mixture of active hydrogen functionality-containing compound selected from at least one member of the group consisting of (i) hydrocarbon polymer containing at least one terminal hydroxyl group, (ii) hydrophilic group-containing diol and, optionally, (iii) at least one member of the group consisting of polymeric polyol, low molecular weight diol, monofunctional reactant and trifunctional or higher functionality branching reactant, with (b) at least one diisocyanate.

39. The process of claim 38 wherein hydrocarbon polymer (i) is obtained from the polymerization of at least one olefinic monomer.

40. The process of claim 38 wherein hydrocarbon polymer (i) is hydroxyl-terminated polybutadiene or hydrogenated derivative thereof.

41. The process of claim 38 wherein hydrophilic group-containing diol (ii) is at least one member selected from the group consisting of ionic group-containing compound, potential ionic group-containing compound, lateral ionic group-containing compound, terminal nonionic hydrophilic group-containing compound, anionic group-containing compound and cationic group-containing compound.

42. The process of claim 41 wherein the terminal nonionic hydrophilic group-containing compound is a polyethyleneoxide and the ionic group-containing compound is at least one member selected from the group consisting of carboxylate compound, sulfonate compound and quarternary nitrogen compound.

43. The process of claim 41 wherein the ionic group-containing compound is a dihydroxy alkanoic acid.

44. The process of claim 43 wherein the dihydroxy alkanoic acid is at least one member selected from the group consisting of dimethylol propionic acid and dimethylol butanoic acid.

45. The process of claim 38 wherein the polymeric polyol (iii) is at least one member selected from the group consisting of polyester diol, polyether diol, polyetherester diol, polyesterether diol, polythioester dithiol, polycarbonate diol, polyacetal diol and polycaprolactone polyol.

46. The process of claim 38 wherein low molecular weight diol (iii) is a short chain aliphatic diol.

47. The process of claim 46 wherein the short chain aliphatic diol is trimethylolpropane.

48. The process of claim 40 wherein the diisocyanate is of the general formula $R(NCO)_2$ wherein R is selected from the group consisting of divalent aliphatic group containing from 4 to about 18 carbon atoms and divalent cycloaliphatic group containing from 5 to about 15 carbon atoms.

49. The process of claim 48 wherein the diisocyanate is at least one member selected from the group consisting of hexamethylene diisocyanate, cyclohexane-1,3-diisocyanate, cyclohexane-1,4-diisocyanate, 1-isocyanato-3-isocyanatomethyl-3,5,5-trimethyl-cyclohexane, bis-(4-isocyanatocyclohexyl)methane; 1,3-bis(isocyanatomethyl) cyclohexane, 1,4-bis-(isocyanatomethyl)cyclohexane and bis-(4-isocyanato-3-methyl-cyclohexyl)methane.

50. The process of claim 37 wherein the difunctional chain extender is at least one diamine selected from the group consisting of hydrazine, adipic dihydrazide, ethylene diamine, hexane diamine, diisophorone diamine, polyoxypropylene diamine, 2-methyl pentane diamine and piperazine.

51. The process of claim 37 wherein during chain-extending step (c) the difunctional chain extender optionally includes a trifunctional amine, an alcohol amine or mixtures thereof.

52. The process of claim 38 wherein the ratio of isocyanate groups in the diisocyanate to active hydrogen group functionality in the active hydrogen group-containing compound is from about 1.1 to about 3 on an equivalent basis.

53. The process of claim 38 wherein the ratio of isocyanate groups in the diisocyanate, to active hydrogen functionality in the active hydrogen functionality containing compound, is from about 1.2 to about 2 on an equivalent basis.

54. The polyolefin-polyurethane hybrid aqueous dispersion resulting from the process of claim 35.

55. The polyolefin-polyurethane hybrid aqueous dispersion resulting from the process of claim 36.

56. The polyolefin-polyurethane hybrid aqueous dispersion resulting from the process of claim 37.

57. The polyolefin-polyurethane hybrid aqueous dispersion resulting from the process of claim 38.

58. A hybrid aqueous dispersion of self-emulsifiable polyolefin and polyurethane prepolymer which comprises:
   a) at least one chain-extended water-dispersable polyurethane prepolymer;
   b) at least one aqueous emulsion of self-emulsifiable polyolefin prepared by the process of claim 1, the chain-extended water-dispersible polyurethane prepolymer being dispersed therein.

59. The hybrid aqueous dispersion of claim 58 wherein the functionality of the self-emulsifiable polyolefin is, or contains, active hydrogen functionality such that the chain-extended water-dispersable polyurethane reacts with the active hydrogen functionality to provide a hybrid aqueous dispersion of self-emulsifiable polyolefin and polyurethane.

60. The hybrid aqueous dispersion of claim 59 wherein the active hydrogen functionality is at least one member selected from the group consisting of carboxylic acid and carboxylic acid anhydride.

61. A hybrid aqueous dispersion of polyolefin and polyurethane prepolymer which comprises:
   a) at least one chain-extended water-dispersable polyurethane prepolymer;
   b) at least one aqueous emulsion of polyolefin of claim 30, the chain-extended water-dispersible polyurethane prepolymer being dispersed therein.

62. The polyolefin-polyurethane hybrid aqueous dispersion of claim 61 wherein the functionality of functionalized polyolefin contains active hydrogen such that the chain-extended water-dispersable polyurethane reacts with the active hydrogen-containing functionality to provide a hybrid aqueous dispersion of functionalized polyolefin and polyurethane.

63. The polyolefin-polyurethane hybrid aqueous dispersion of claim 62 whereas the active hydrogen-containing functionality is at least one member selected from the group consisting of carboxylic acid, carboxylic acid anhydride, amine and hydroxyl.

64. A polymeric substrate coated with the polyolefin-polyurethane hybrid aqueous dispersion of claim 54.

65. A polymeric substrate coated with the polyolefin-polyurethane hybrid aqueous-dispersion of claim 55.

66. A polymeric substrate coated with the polyolefin-polyurethane hybrid aqueous dispersion of claim 56.

67. A polymeric substrate coated with the polyolefin-polyurethane hybrid aqueous dispersion of claim 57.

68. A polymeric substrate coated with the polyolefin-polyurethane hybrid aqueous dispersion of claim 58.

* * * * *